United States Patent [19]

Hinds

[11] 4,161,889
[45] Jul. 24, 1979

[54] GYROSCOPIC POWER TRANSMISSION SYSTEM

[76] Inventor: Virgil Hinds, 1950 Miller Rd., Ann Arbor, Mich. 48103

[21] Appl. No.: 785,943

[22] Filed: Apr. 8, 1977

[51] Int. Cl.² ............... G01C 19/02; F16H 3/74; F16H 33/10
[52] U.S. Cl. ............... 74/5 R; 74/751; 74/64; 74/86
[58] Field of Search ............ 74/5 R, 61, 86, 751, 74/5.34, 64, 60, 52, 5.37

[56] References Cited

U.S. PATENT DOCUMENTS 1,518,762 12/1924 Tanner ............... 74/5 R X
3,203,644 8/1965 Kellogg, Jr. ............ 74/5.22 X Primary Examiner—Samuel Scott
Assistant Examiner—Don E. Ferrell
Attorney, Agent, or Firm—Hauke and Patalidis

[57] ABSTRACT

A constant torque power transmission consisting of a rotating mass, or gyroscope, rotating around a first axis and supported by a frame or enclosure in turn pivotally supported about a second axis at right angle to the first axis by a gimbal, the gimbal being pivotably supported around a third axis disposed at a right angle to the second axis. A reciprocating power input oscillates the gimbal and the rotating mass about the third axis, causing the rotating mass frame or enclosure to develop a precessional force oscillating about the second axis.

21 Claims, 4 Drawing Figures

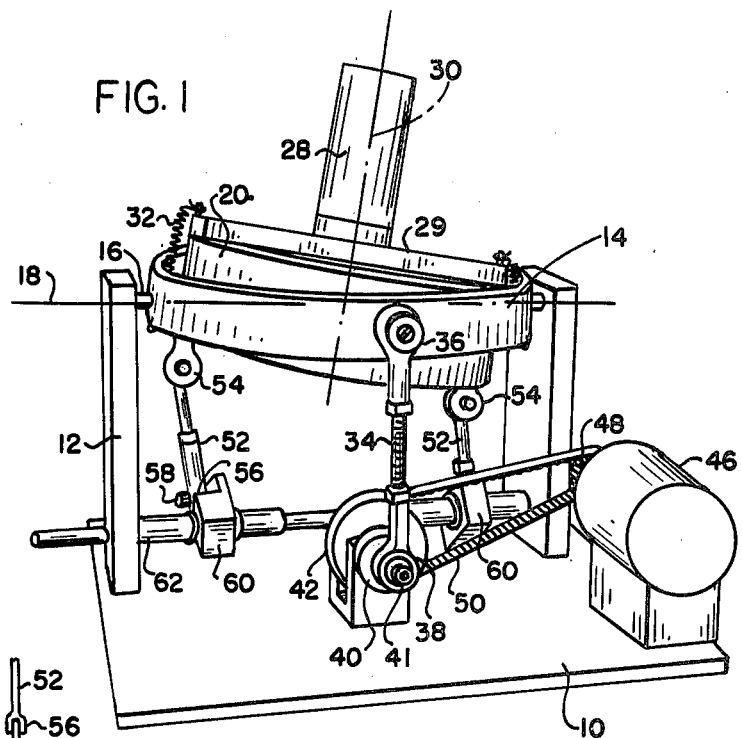
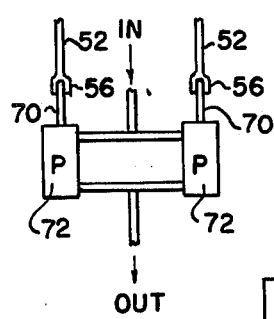
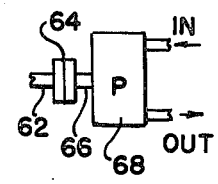
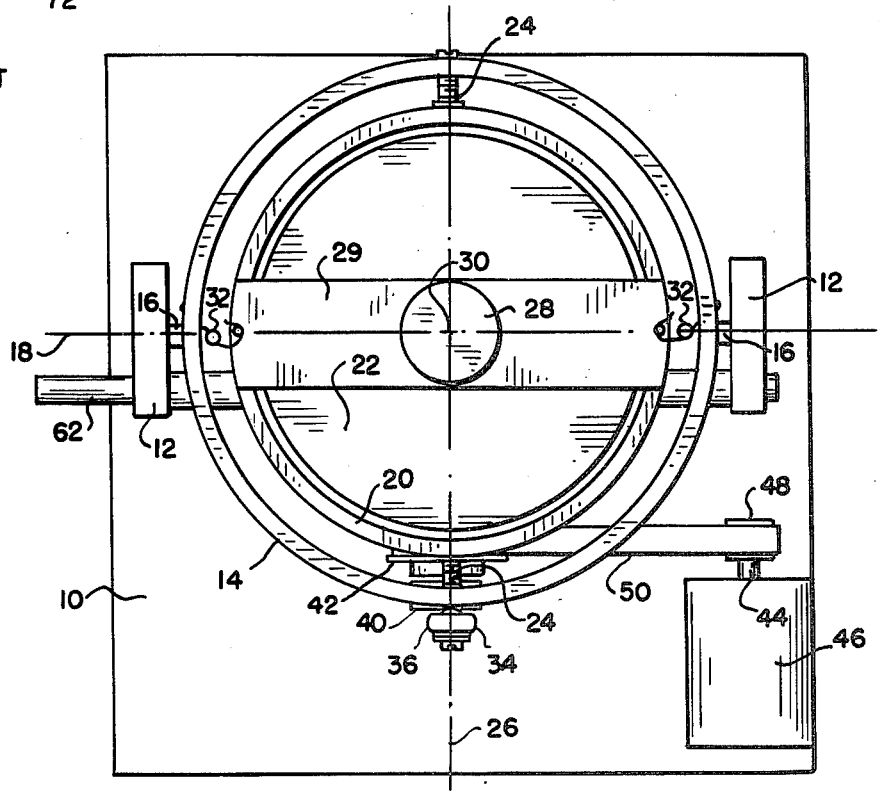

GYROSCOPIC POWER TRANSMISSION SYSTEM

BACKGROUND OF THE INVENTION

The present invention relates to a power transmission device converting a reciprocating power input to a reciprocating output, at a constant average torque.

It is well known that a rotating mass, or gyroscope, tends to remain oriented in a plane perpendicular to its spin axis. When a force is applied to the gyroscope spin axis urging the spin axis to be displaced in a different direction, a precessional momentum or force is induced. If an oscillatory motion is applied to the gyroscope spin axis, the precessional momentum is also oscillatory and is exerted in a plane perpendicular to the spin axis, the oscillary motion being maximum 90° away from the point of application of the input oscillatory motion.

The present invention provides a constant torque transmission device comprising a rotating mass or gyroscope which is caused to spin, for example, by way of an electric motor coupled to its hub shaft. The gyroscope spins relative to an enclosure or frame journally supporting the gyroscope shaft, the enclosure or frame being pivotably supported about an axis within a ring or gimbal. The gimbal is in turn pivotably supported, about an axis disposed at right angle with the axis supporting the gyroscope enclosure or frame, by a pair of support brackets depending from a support plate or base, on which are also mounted a power input and a power output. The power input consists of a rigid connecting link having an end pivotably connected to the gimbal at a point substantially on the axis around which the gyroscope enclosure or frame is free to pivot. The input connecting link is reciprocated by any convenient means such as by way of a prime mover driving a shaft provided with an eccentric crank pivotably supporting the other end of the connector link. The output consists of one or a pair of connecting links each having an end pivotably connected to the gyroscope enclosure or frame at a point substantially 90°, in angular position, from the point of application of the input connecting link, i.e., in a plane substantially passing through the axis of pivoting of the gimbal.

When a deflection is applied to the gimbal, and consequently to the gyroscope enclosure or frame, by the input connecting link, the gyroscope enclosure or frame is precessionally displaced, and the reaction of the pivot bearing causes the gyroscope enclosure or frame to oscillate about its axis of pivoting and thus causes reciprocation of the output connecting links. The reciprocating motion of the output connecting links may be transformed into a rotary motion of a shaft, by means of one-way clutches provided with an eccentric crank pin to which the end of the connecting link is connected. Alternatively, the reciprocating output connecting links may be directly coupled to the reciprocating member of a reciprocating fluid pump which supplies, at its output, a hydraulic or gaseous fluid at a flow rate and a pressure representative of the torque being transmitted.

SUMMARY OF THE PRESENT INVENTION

The present invention therefore provides a power transmission operating substantially at constant torque and which is capable of transmitting torque with only negligible losses, due to frictional forces in the pivots and the gyroscope shaft bearing, and which is capable of developing at its output a very high torque to a stalled or nearly stalled load, with a relatively low power input. The present invention, consequently, has many applications such as for machine tools and motor vehicle transmission systems, for winches, elevators and the like. More particularly, in power transmission for motor vehicles, the present invention permits to provide an individual drive for each wheel, such individual drive being disposed at, or proximate to, each wheel which it drives.

The many objects and advantages of the present invention will become apparent to those skilled in the art when the following description of the best modes contemplated for practicing the invention is read in conjunction with the accompanying drawing wherein:

BRIEF DESCRIPTION OF THE DRAWING

FIG. 1 is a perspective view of a power transmission device according to the present invention;

FIG. 2 is a top plan view thereof;

FIG. 3 is a schematic representation of a portion thereof showing a rotary type hydraulic pump connected to the output of the power transmission; and FIG. 4 is another schematic representation of a portion thereof showing a reciprocating hydraulic pump connected to the output.

DETAILED DESCRIPTION OF THE PREFERRED EMBODIMENTS

Referring now to FIGS. 1–2, a support base 10 is illustrated with a pair of parallel upright brackets 12. The upright brackets support a gimbal ring 14 by means of a pair of pivot members 16. The pivot members 16 define a pivot axis 18 for the gimbal ring 14, the pivot axis 18 being aligned with a diameter of the gimbal ring 14. The gimbal ring 14 in turn pivotably supports an enclosure or frame 20 for a rotating mass, or gyroscope, 22 by way of pivot members 24. The pivot members 24 support the gyroscope enclosure or frame 20 within the gimbal ring 14 along a pivot axis 26 which is angularly disposed 90° away from the pivot axis 18 of the gimbal ring 14 relative to the support brackets 12.

Any convenient means can be used for spinning the gyroscope 22 at high velocity such as, for example, an electric motor 28 coupled to the gyroscope hub shaft, not shown, the latter being journalled in appropriate bearing members fitted in the end plates 29 of the gyroscope enclosure or frame 20. The spin axis 30 of the gyroscope 22 is therefore substantially perpendicular to the plane defined by the two pivot axes 18 and 26, when the enclosure or frame 20 and the gimbal ring 14 are in a neutral position, i.e., when they are concentric to each other and co-planar. A pair of return springs, such as shown at 32, may be used to urge the gyroscope enclosure or frame 20 and the gimbal ring 14 to the neutral position wherein the spin axis 30 of the gyroscope 22 is substantially orthogonal to the plane of the pivot axes 18 and 26.

The gimbal ring 14 and the gyroscope frame or enclosure 20 are capable of oscillating in unison about the pivot axis 18 of the gimbal ring, relative to the support bracket members 12. Oscillating motion is applied to the gyroscope and gimbal assembly by an input connecting link 34 having an end 36 connected through a socket and ball bearing to the projecting end of the pivot member 24, pivotably supporting the gyroscope enclosure or frame 20 relative to the gimbal ring 14, such that reciprocation of the input connecting link 34 is transmitted to the gimbal ring 14 and, through the pivots 24, to the gyroscope enclosure or frame 20 in a plane defined by the pivoting axis 26 and the gyroscope spinning axis 30.

In the example of structure illustrated, the input connecting link 34 is reciprocated as a result of its other end 38 being fastened, by means of a ball and socket bearing member, to crank pin 41 on an eccentric 40 driven by a pulley 42 which is driven in rotation by the output shaft 44 of an electric motor 46 mounted on the support base 10, the output shaft 44 of the electric motor 46 driving the pulley 42 via a pulley 48 keyed on the end of the motor output shaft 44 and a belt 50. It is readily apparent that the eccentric 40 could be driven directly from the output of an electric motor or other prime mover. It is also readily apparent that a pair of input connecting links could be connected to the gimbal ring 14, at diametrically opposed positions along the axis 26, each connecting link being oscillated by a separate prime mover or by a single prime mover, through appropriate shaft and eccentric means.

A pair of output connecting links 52 are pivotally attached at an end 54 to the gyroscope enclosure or frame 20, by means of a ball and socket connecting means. The other end 56 of each output connecting link 52 is connected, by means of a ball and socket means, to an eccentric crank pin 58 projecting from the housing of a one-way clutch 60 mounted on an output shaft 62 journalled through the support brackets 12. In this manner, any reciprocating motion of the output connecting links 52 is converted by the one-way clutches 60 into an intermittent unidirectional rotation of the output shaft 62 thus converting the torque applied to the output connecting links 52 into a torque applied to the output shaft 62. Although a single output connecting link 52 could be used, for the purpose of balance and for a better application of torque forces to the output shaft 52, in the example of the invention here illustrated a pair of output connecting links 52 are provided, one of which has its end 56 pivotably attached to the crank pin of a one-way clutch 60 on one side of the output shaft 62 and the other has its end 56 pivotably attached to the crank pin of a one-way clutch 60 angularly disposed on the other side of the output shaft 62, such as to balance the load on the journal bearings of the output shaft 62.

Oscillation of the gimbal 14 and of the gyroscope enclosure or frame 20 about the pivot axis 18 causes, through precessional force action, and its reaction applied through the pivot members to the support brackets 12 and the base 10, a force tending to rotate the direction of the gyroscope spinning axis 30 in a plane containing the pivot axis 18. Consequently, the precessional force is exerted as a torque having an axis of pivoting corresponding to the free axis of pivoting of the gyroscope enclosure or frame 20 within the gimbal ring 14, that is about the pivot axis 26, 90° in angular position away from the gimbal pivot axis 18 relative to the support brackets 12. Therefore, reciprocation of the input connecting link 34 is transformed into reciprocation, in opposite directions, of the output links 52 which, through the one-way clutches 60, is converted into a rotary motion of the output shaft 62.

A considerable torque can be transmitted to the output of the power transmission system of the invention, with very low input power. For a given power input, a given mass and angular velocity of the gyroscope 22, the torque at the output of the system can be calculated as follows:

Spinning gyroscopes develop a precessional force according to the following equation:

(1) $Rl = I W_1 W_2$, wherein
R is precessional force;
l is the length of the lever arm through which the precessional force, R, is applied;
I is the inertia of the gyroscope about its spinning axis;
$W_1$ is the angular velocity of the force applied to the gyroscope and tending to displace its spinning axis direction, therefore the angular velocity expressed in rad/sec of the input connecting link; and
$W_2$ is the angular velocity of the gyroscope wheel in rad/sec.

The inertia of the gyroscope about its spin axis is given by the equation:

(2) $I = Wr^2/g$ wherein W is the weight of the gyroscope, r is the effective radius of the gyroscope wheel, and g is the gravitational acceleration, or 32 ft/sec².

Assuming, for example a gyroscope wheel 22 having a weight of 6 lbs. and an effective radius of 6 in., and l being equal to 6 in., and assuming further that the gyroscope frame 20, together with the gimbal ring 14, is driven by the input connecting link 34 plus and minus 15° about the pivot axis 18, for a total of 30° deflection, the gyroscope enclosure or frame 20 is moved through 60° during a single revolution of the eccentric 40. 60° is equivalent to $\pi/3$ radians. If the input eccentric 40 is rotated at 3,000 rpm, or 50 rev/sec, $W_1$ is therefore $50\pi/3$ rad/sec. With a gyroscope 22 rotating at 18,000 rpm, or 300 rev/sec., $W_2$ equals $300 \times 2\pi$ or $600\pi$ rad/sec.

By replacing I in equation (1) by its value obtained from equation (2), and by resolving equation (1) as a function of R, the following equation is obtained:

$$R = \frac{Wr^2 \omega_1 \omega_2}{lg} = \quad (3)$$

$$\frac{6 \times (.5)^2 \times 50 \times \frac{\pi}{3} \times 600\pi}{.5 \times 32} = 9252.7525 \text{ lbs.}$$

With a crank pin 58 of the one-way clutches 60 having its axis 3 in., or 0.25 ft., from the axis of the output shaft 62, the torque applied to the output shaft is consequently equal to 9252.7525 lbs. × 0.25 = 2313.1881 ft-lbs.

It will therefore be readily appreciated that the apparatus of the invention is capable of developing at its output a very substantial torque, in spite of a relatively small size of the diverse elements, as shown by the numerical example hereinabove, given for illustrative purposes only.

In view of the high torque developed at the output of the power transmission apparatus of the present invention, it will also be readily apparent that the invention has many applications in various apparatus. For example, the output can be utilized to operate a hoist, a crane, an elevator, a winch or the like. Torque is increased at the output by increasing $W_1$ or $W_2$, or both until the torque overcomes gravity or frictional loads. Therefore, the load displaced by the output is accelerated at a controlled and progressive rate.

The apparatus of the invention can be adapted to provide individual drive for each powered wheel of a multiple-wheel drive motor vehicle. As torque is applied to each wheel individually, there is no need for a differential.

As the oscillating or reciprocating input to the power transmission of the present invention does not require a fixed length of stroke, the input connecting rod can be driven by a free-piston internal combustion engine, of the spark ignition type, compression ignition type or Stirling-cycle type.

In power transmission application requiring remote control, such remote control may be carried out in most cases by merely adjusting either the angular velocity $W_1$ of the input or the angular velocity, $W_2$, of the gyroscope, or both.

The present invention can readily be adapted to driving a hydrostatic or hydrokinematic transmission. Such an arrangement is schematically illustrated at FIGS. 3 and 4. At FIG. 3, the output shaft 62 is shown connected, through a coupling 64, to the input shaft 66 of a rotary-type fluid pump 68, such as a vane-type pump or a lobe-type pump. It is readily apparent that the output connecting links 52 may alternatively be connected directly, each through a one-way clutch to an input shaft of a pump.

FIG. 4 illustrates schematically an arrangement wherein the end 56 of each output reciprocating connecting link 52 is connected to the reciprocable element 70 of a reciprocating pump 72. Such reciprocable element 70 may be a rod connected to a reciprocable piston or, in the alternative, to the reciprocable cylinder of a pump provided with a stationary piston.

Having thus described the present invention by way of an example of a structural practical embodiment thereof, modifications whereof will be readily apparent to those skilled in the art, what is claimed as new is as follows:

I claim:

1. A power transmission system comprising a mass rotating about a first axis, said rotating mass being in a frame pivotably supported by a gimbal about a second axis at right angle to said first axis, pivot means pivotably supporting said gimbal about a third axis at right angle to said second axis and at variable angle relative to said first axis, first power means oscillating said gimbal and said rotating mass frame about said third axis, second power means reciprocable by said rotating mass frame when precessionally oscillating about said second axis and biasing means urging said first axis to a position wherein said first axis is orthogonal to said third axis.

2. The power transmission system of claim 1 wherein said first power means comprises a first rigid link pivotally attached at one end to said gimbal at a point proximate to said second axis.

3. The power transmission system of claim 2 wherein said second power means comprises a second rigid link pivotally attached at one end to said frame at a point substantially ninety degrees from said axis.

4. The power transmission of claim 3 wherein said rigid link is attached at its other end to the reciprocating member of a reciprocating fluid pump.

5. The power transmission of claim 4 wherein said first rigid link is attached at its other end to a crank driving a one-way clutch member connected to a shaft.

6. The power transmission of claim 5 wherein said shaft drives a rotary-type fluid pump.

7. The power transmission system of claim 1 wherein said second power means comprises a rigid link pivotally attached at one end to said frame at a point substantially ninety degrees from said axis.

8. A power transmission system comprising a mass rotating about a first axis, said rotating mass being in a frame pivotably supported by a gimbal about a second axis at right angle to said first axis, pivot means pivotally supporting said gimbal about a third axis at right angle to said second axis and at variable angle relative to said first axis, power input means oscillating said gimbal and said rotating mass frame about said third axis, and power output means reciprocable by said rotating mass when precessionally oscillating about said second axis wherein said power output means comprises a rigid link pivotably attached at one end to said frame at a point substantially ninety degrees from said axis.

9. The power transmission of claim 8 wherein said rigid link is attached at its other end to a crank driving a one-way clutch member connected to an output shaft.

10. The power transmission of claim 9 wherein said output shaft drives a rotary-type fluid pump.

11. The power transmission of claim 8 wherein said rigid link is attached at its other end to the reciprocating member of a reciprocating fluid pump.

12. The power transmission system of claim 8 wherein said power output means comprises a rigid link pivotally attached at one end to said input at a point proximate to said second axis.

13. The power transmission system of claim 8 further comprising biasing means urging said first axis to a position wherein said first axis is orthogonal to said third axis.

14. A power transmission system comprising a mass rotating about a first axis, said rotating mass being in a frame pivotably supported by a gimbal about a second axis at right angle to said first axis, pivot means pivotably supporting said gimbal about a third axis at right angle to said second axis and at variable angle relative to said first axis, power input means oscillating said gimbal and said rotating mass frame about said third axis and power means reciprocable by said rotating mass frame when precessionally oscillating about said second axis wherein said power input means comprises a rigid link pivotally attached at one end to said gimbal at a point proximate to said second axis.

15. The power transmission system of claim 14 wherein said rigid link is attached at its other end to a crank driven by an input shaft.

16. The power transmission of claim 15 wherein said power output means comprises a second rigid link pivotably attached at one end to said frame at a point substantially ninety degrees from said second axis.

17. The power transmission of claim 14 wherein said power output means comprises a second rigid link pivotably attached at one end to said frame at a point substantially ninety degrees from said second axis.

18. The power transmission of claim 17 wherein said second rigid link is attached at its other end to a crank driving a one-way clutch member connected to an output shaft.

19. The power transmission of claim 18 wherein said output shaft drives a rotary-type fluid pump.

20. The power transmission of claim 17 wherein said second link is attached at its other end to the reciprocating member of a reciprocating fluid pump.

21. The power transmission system of claim 14 further comprising biasing means urging said first axis to a position wherein said first axis is orthogonal to said third axis.

* * * * *

UNITED STATES PATENT AND TRADEMARK OFFICE
CERTIFICATE OF CORRECTION

PATENT NO. : 4,161,889

DATED : July 24, 1979

INVENTOR(S) : Virgil Hinds

It is certified that error appears in the above-identified patent and that said Letters Patent are hereby corrected as shown below:

Column 1, line 16, correct the spelling of "oscillatory";

Column 4, lines 1, 7, 11, 33 and 62, "$W_1$" and "$W_2$" should read -- $\omega_1$ -- and -- $\omega_2$ --, respectively;

Column 5, line 12, "$W_1$" and "$W_2$" should read -- $\omega_1$ -- and -- $\omega_2$ -- respectively;

Column 6, line 27, change "proximateto" to --proximate to--.

Signed and Sealed this

Thirtieth Day of October 1979

[SEAL]

Attest:

RUTH C. MASON
*Attesting Officer*

LUTRELLE F. PARKER
*Acting Commissioner of Patents and Trademarks*